Figure 1:
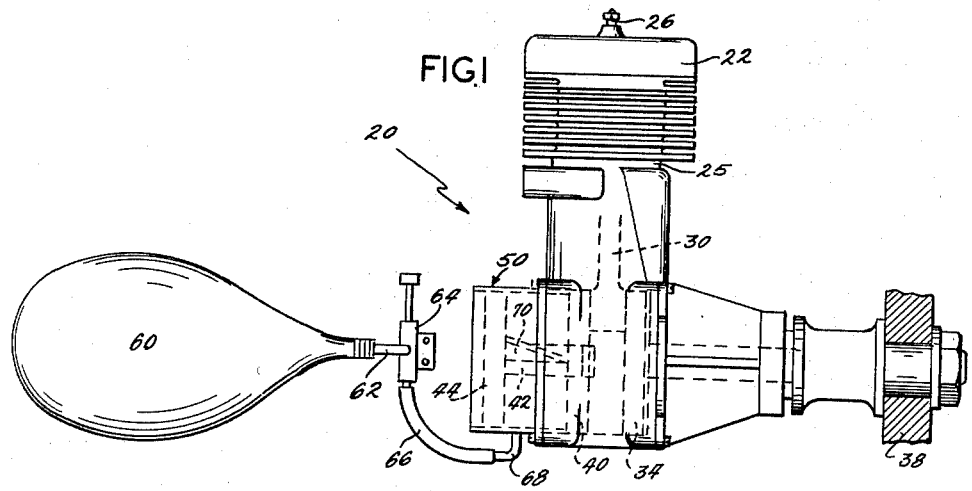

Dec. 15, 1959 W. A. MITCHENER 2,917,032
INTERNAL COMBUSTION ENGINE
Filed March 25, 1957 2 Sheets-Sheet 1

INVENTOR:
WILLIAM A. MITCHENER
By Gravely, Lieder, Woodruff and Wills
ATTORNEYS.

Dec. 15, 1959  W. A. MITCHENER  2,917,032
INTERNAL COMBUSTION ENGINE
Filed March 25, 1957  2 Sheets-Sheet 2

INVENTOR
WILLIAM A. MITCHENER

BY Gravely, Lieder, Woodruff and Wills
ATTORNEYS.

United States Patent Office 2,917,032
Patented Dec. 15, 1959

2,917,032

INTERNAL COMBUSTION ENGINE

William A. Mitchener, Peoria, Ill.

Application March 25, 1957, Serial No. 648,345

8 Claims. (Cl. 123—73)

This invention relates generally to internal combustion engines and more particularly to improved charging and air fuel mixing means for two cycle internal combustion engines.

A major problem with known internal combustion engines and particularly with miniature engines for model airplanes and the like has been to supply a constant abundance of thoroughly mixed air and fuel. Failure in known engines to solve this problem has resulted in loss of speed and power and generally in inferior engine performance.

A major object of the present invention is to overcome these known causes of inferior engine performance by providing an engine construction which constantly maintains an abundant, thoroughly mixed, supply of air and fuel.

Another object of this invention is to provide relatively inexpensive means for thoroughly mixing and super-charging the air-fuel supply for an internal combustion engine.

Another object is to provide an air-fuel pre-crankcase mixing chamber for internal combustion engines which is capable of maintaining an abundant supply of pre-mixed and supercharged air and fuel.

Another object is to provide improved means in two cycle internal combustion engines for force feeding the air-fuel mixture into the engine crankcase where it is further compressed before entry into the engine cylinder.

Another object is to increase the efficiency of internal combustion engines by providing crankcase means with relatively large passages that minimize resistance to flow and that operate with minimum mechanical friction.

Still another object of the present invention is to provide an improved air-fuel induction system for internal combustion engines which is relatively simple to construct, is light weight and compact, and is readily installed on new and existing engines.

Other objects and advantages of the present invention will become apparent while considering the following specification in conjunction with the particular embodiments of the invention shown in the accompanying drawings.

Figure 2:
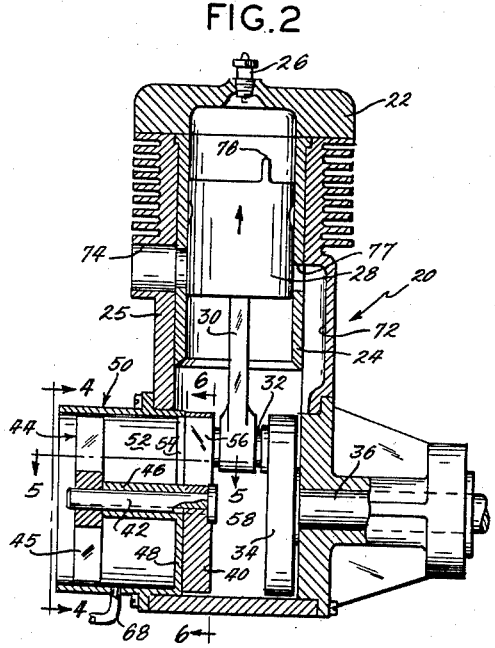
Figure 3:
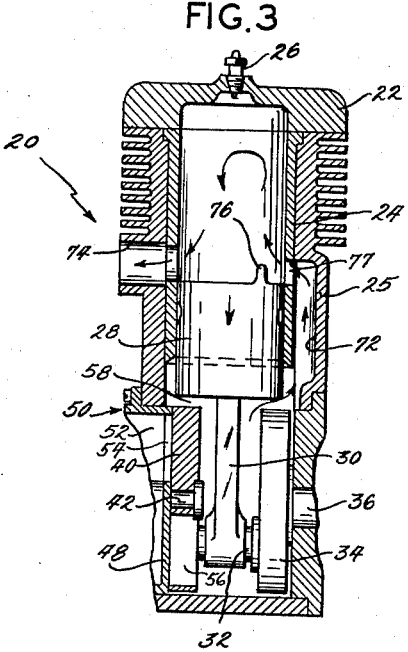
Figure 9:
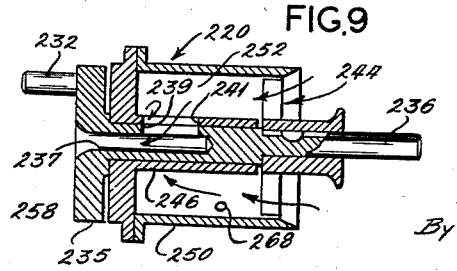
Figure 4:
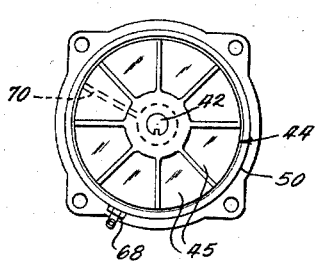
Figure 5:
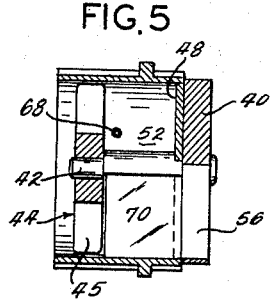
Figure 6:
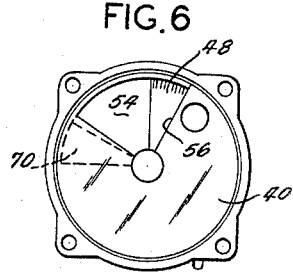
Figure 7:
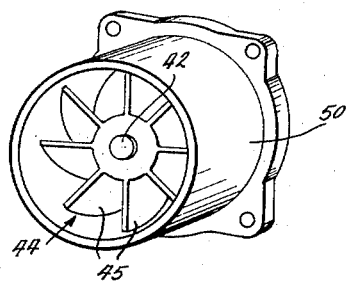
Figure 11:
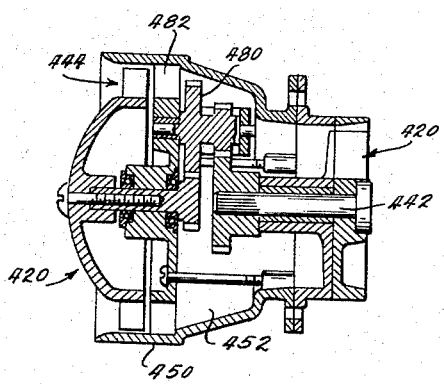
Figure 10:
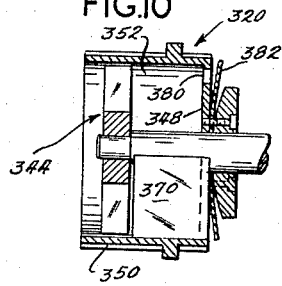

In the drawings:

Fig. 1 shows a side elevational view of an internal combustion engine incorporating the teachings of the present invention, Fig. 2 is a fragmentary cross-sectional elevational view taken through the center of the engine in Fig. 1, Fig. 3 is a fragmentary cross-sectional elevational view similar to Fig. 2 but showing the engine piston near the bottom of its stroke, Fig. 4 is an elevational view showing the air intake portion of the internal combustion engine in Fig. 2, and taken along line 4—4 therein, Fig. 5 is a fragmentary cross-sectional view of the engine in Fig. 2, taken in a horizontal plane along line 5—5 therein, Fig. 6 is an elevational view of the air-fuel intake portion of the engine in Fig. 2, taken along line 6—6 therein, Fig. 7 is a perspective view of the air-fuel intake portion of the engine shown in Figs. 1, 2 and 3, Fig. 8 is a fragmentary cross-sectional elevational view similar to Fig. 2 showing a modified form of the internal combustion engine, Fig. 9 is a fragmentary cross-sectional elevational view showing another modified form of the present engine, Fig. 10 is a fragmentary cross-sectional view of another modified form of the engine of Fig. 2, and Fig. 11 shows a fragmentary cross-sectional view of yet another modified form of the engine in Fig. 2.

Referring to the drawings in greater detail, the reference number 20 in Figs. 1, 2 and 3 indicates an internal combustion engine constructed according to the teachings of the present invention. The engine 20 has a head 22, a cylinder 24 formed in the main block 25 and an ignition plug 26 mounted in the head. A piston 28 is slidably positioned in the cylinder 24 and is operatively connected by connecting rod 30, pin 32, and flywheel 34 to a crankshaft 36. The crankshaft 36 delivers power to a suitable load such as propeller 38.

A rotating disc 40, a shaft 42, and a blower 44 are operatively connected to the crankshaft 36 by the pin 32. The shaft 42 is axially aligned with the crankshaft 36 and extends through a sleeve 46 which is attached to a stationary disc 48. The disc 48 is the base portion of a cup-shaped member 50. The cup-shaped member 50 is open at the end opposite the disc 48 and the blower 44 is rotatably mounted near the open end thereof. The blower 44 has a plurality of radial blades 45 (Fig. 7) which are angularly displaced relative to the direction of rotation of the shaft 42 so that when the blower 44 rotates it draws air from outside into chamber 52 in the cup-shaped member 50.

The stationary disc 48 and the rotating disc 40 are provided with openings 54 and 56 respectively (Fig. 6) which cooperate as a rotary valve to register once for each cycle of operation of the piston 28 and provide communication between the chamber 52 and crankcase 58.

A fuel cell or bladder 60 which is shown externally of the engine contains the fuel supply for the engine. The bladder 60 is constructed of elastic material and is inflated by the fuel supply so that the fuel is under pressure to escape therefrom. One end of the bladder 60 is connected to a conduit 62, a needle valve 64, and a second conduit 66. The conduit 66 has its opposite end connected to a fuel jet 68 which is mounted on the cup-shaped member 50. When the engine 20 is operating, the fuel from the bladder 60 is metered through the needle valve 64 to the jet 68 and mixes in the chamber 52 with the air being drawn in by the blower 44. To convert the air velocity from the blower into static pressure and to guide the air into valve opening 54, a stationary radial fin 70 (Figs. 1, 4 and 5) is mounted therein. The fin 70 extends radially from the sleeve 46 to the wall of the cup-shaped member 50.

A passage 72 (Figs. 2 and 3) extends upwardly in the engine block 25 providing fuel flow communication between the crankcase 58 and the cylinder 24, and a passage 74 for exhausting the products of combustion extends outwardly from the cylinder 24 through the block 25. A rib 76 is formed on the upper surface of the piston 28 to deflect the incoming fuel mixture upwardly as it enters the cylinder 24.

Of particular importance to the present invention is the combination of the pre-crankcase mixing chamber 52, the blower 44, and the valve means between the chamber 52 and the crankcase 58. These features are important because they produce and maintain an abundant supply of pre-mixed and supercharged air and fuel which is fed into the crankcase 58. Furthermore, the valve means which include openings 54 and 56 are timed to register when the piston 28 is moving upward so that the supercharged fuel supply is forced out of chamber 52 and drawn into the crankcase 58. The valve means is timed to close on the downward stroke of the piston when the pressure in the crankcase 58 would otherwise be sufficient to cause blow back into the chamber 52. As the piston continues to move downwardly it further compresses the air-fuel mixture until the cylinder intake port 77 is uncovered causing entry of the compressed charge from the crankcase 58 through passage 72 and into the cylinder 24.

Figure 8:
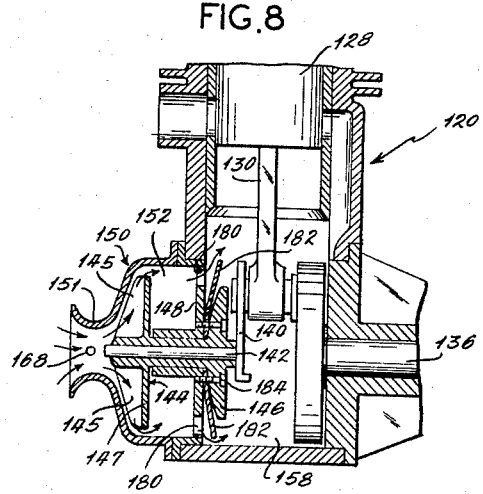

A modified form of the engine 20 is shown in Fig. 8 and is identified by the number 120. The modified engine 120 differs from the engine 20 principally in the construction of the pre-mixing chamber, the blower, the air-fuel inlet to the mixing chamber and the valve which communicates the mixing chamber with the crankcase.

The modified engine 120 has a blower 144 which is operatively connected to crankshaft 136 by a counterbalanced rotating member 140. The blower 144 is mounted in an opening in a housing member 150 and has a plurality of radial blades 145 which are backed on one edge by an annular disc 147.

The housing 150 for the blower 144 is constructed having a restricted air inlet passage which is formed into a venturi 151, and a fuel jet 168 is positioned in the venturi 151. The suction action of the venturi 151 as air passes through it draws a fuel spray from the jet 168 and the incoming air mixes with the fuel spray and enters the premixing chamber 152.

The disc portion 147 of the blower 144 prevents the mixture from moving straight into the chamber 152, as in engine 20 (Figs. 2 and 3), and instead the blower 144 imparts a centrifugal force to the mixture, forcing the mixture into the chamber 152 between the edge of the disc 147 and the wall of the chamber 150. The centrifugal force imparted to the mixture supercharges the mixture in the chamber 152 so that an abundant supply thereof is constantly maintained.

The modified engine 120 uses a different valve construction than engine 20 for controlling the flow of the fuel mixture from the mixing chamber 152 to the crankcase 158. The valve in engine 120 consists of stationary wall 148 which has a plurality of openings 180 formed therein, and a plurality of flexible leaf members or valves 182 which are mounted in the crankcase 158 on the opposite side of the wall 148 from the chamber 152. One leaf member is provided for each opening 180. The leaf members 182 are mounted between a flanged sleeve member 146 and the wall 148 and are held in place therebetween by screws 184.

The leaf members 182 are bendable and move into and out of engagement with the wall 148, respectively closing and opening the associated openings 180 depending on the relationship of the pressure in the chamber 152 and in the crankcase 158. The leaf type valve shown in Fig. 8 has the advantage over the rotary valve shown in Figs. 2, 3 and 6 because it is better able to equalize the pressure in the pre-mixing chamber 152 and the crankcase 158, and yet prevents reverse flow from the crankcase 158 into the chamber 152.

When the piston 128 moves upwardly, a partial vacuum is created in the crankcase 158 which draws the air-fuel mixture from the chamber 152 into the crankcase 158. In so doing, the leaf members 182 yield and move away from their associated openings 180 aided by the relatively high pressure in the chamber 152. During downward movement of the piston 128, however, the pressure developed in the crankcase 158 is relatively large compared with the pressure in the pre-mixing chamber 152, and if the pressure in the crankcase 158 exceeds the pressure in the chamber 152, the leaf members 182 move against wall 148 and close their respective openings 180 and prevent reverse flow from the crankcase 158 into the chamber 152. Since the blower 144 constantly rotates, relatively high pressure is maintained in the chamber 152 and the engine 120 is continuously provided with an abundant supply of supercharged air-fuel mixture. The supercharged fuel mixture also assists in feeding fuel from the crankcase 158 into the cylinder in the same manner as in the engine 20.

Except as noted above, the operation of the modified engine 120 is substantially the same as engine 20.

Fig. 9 shows another modified form 220 of the engine 20. In this modification, a moving air stream from outside is fed into a mixing chamber 252. When the modified engine 220 is mounted on a model airplane or similar device, a cowl (not shown) is usually provided on the fuselage for guiding the air stream into mixing chamber 252. The chamber 252 is annular and extends between sleeve 246 in which crankshaft 236 is mounted and housing member 250. The crankshaft 236 is attached to a flywheel 235 and is operatively connected to the engine piston and connecting rod (not shown) by pin 232.

The crankshaft 236 has an axial bore 237 in one end thereof which communicates with the crankcase 258 and a sleeve valve consisting of openings 239 and 241 in the crankshaft 236 and sleeve 246 respectively register once each engine cycle and communicate the chamber 252 with the crankcase 258. A fuel jet 268 is mounted at any suitable location in the chamber 252.

A blower 244 is keyed to the crankshaft 236 and is rotatably mounted adjacent to the open end of the chamber 252 to mix the air and fuel and to provide additional supercharging.

Fig. 10 shows another modified form 320 of the engine 20 having a cup-shaped member 350 which is similar to the cup-shaped member 50 shown in Figs. 2 and 3, and a blower 344 similar to blower 44 is mounted near the open end of the cup-shaped member 350. The modified engine 320 has a valve consisting of a wall 348 with openings 380 and leaf members 382 which are similar to the valve shown in Fig. 8. Therefore, the modified engine 320 combines the chamber and blower features of engine 20 with the leaf valve construction of engine 120 (Fig. 8).

Fig. 11 shows another modified engine 420. The construction and operation of engine 420 is similar to engine 20 except that a gear member 480 is mounted in the mixing chamber 452 between the shaft 442 and the blower 444. The gear member 480 enables the blower 444 to rotate at a faster speed than the crankshaft (not shown) and therefore the modified engine 420 draws in a relatively larger volume of air than engine 20. Stator blades 482 and suitable bearing members support the gear member 480 to the housing 450.

*Operation*

When the engine 20 (Figs. 1, 2 and 3) is operating, the crankshaft 36, the flywheel 34, the disc 40, and the blower 44 rotate at the same speed. The rotation of the blower 44 draws air into the pre-mixture chamber 52 and creates a turbulent condition inside the chamber 52 which mixes the fuel from the jet 68 with the incoming air and creates a relatively high pressure inside the chamber 52. The pressure of the mixture in chamber 52 increases until the opening 56 in the rotary disc 40 registers with the opening 54 in the stationary disc 48. When this occurs, the air-fuel mixture passes through the registered openings into the crankcase 58.

When the piston 28 nears the top of its stroke, the ignition plug 26 ignites the mixture and drives the piston downwardly. In the downward position of the piston, the passages 72 and 74 communicate with the cylinder 24 and the products of combustion are exhausted through the opening 74. As the products of combustion are exhausted, they are replaced by the fuel mixture which enters through the passage 72.

The rotary valve shown in Figs. 2, 3 and 6, and the sleeve valve shown in Fig. 9 enable the blowers associated therewith to develop pulses of compressed air and fuel which are relieved when the valve openings register.

The constructions shown in Figs. 8 and 10 operate in substantially the same way as the constructions shown in Figs. 2, 3 and 9 except that leaf valves are employed instead of rotary valves. The advantage of the leaf valve construction is that it reduces the pressure difference between the pre-mixing chamber and the crankcase and enables the pre-mixing chamber to have a relatively smaller volume because the pressure developed in the chamber is always able to relieve itself into the crankcase.

The location of the fuel jets is not critical in any of the constructions shown to illustrate the invention. In the venturi construction (Fig. 8), however, it is usually desirable to position the jet at the narrow or constricted portion of the inlet opening in order to have the greatest suction.

It should be noted in all the constructions that the blower operates all the time while the engine is operating to maintain a supercharged condition and to force feed the fuel into the engine cylinder.

It is also contemplated, as shown in Fig. 11, to provide gearing between the crankshaft and the blower so that the blower operates at a different speed than the crankshaft. If the blower is geared to rotate at a faster speed than the crankshaft, a relatively greater abundance of premixed air and fuel is accumulated, and if the blower rotates slower than the crankshaft relatively less of the mixture accumulates. The operation of the modified engine 420 shown in Fig. 11 otherwise is substantially the same as the operation of engines 20 and 120.

Thus, it is apparent that there has been provided a novel engine construction which fulfills all of the objects and advantages sought therefor. It is to be understood, however, that the foregoing description and the accompanying drawings have been presented only by way of illustration and example and that all changes and alterations in the present disclosure which will be readily apparent to one skilled in the art are contemplated as being within the scope of the invention which is limited only by the claims which follow.

What I claim is:

1. In an internal combustion engine of the two cycle type having a cylinder, a piston movable in the cylinder, and a crankshaft operatively connected to the piston in a crankcase; a housing member mounted in a position on the engine in axial alignment with the crankshaft and having a chamber therein and an opening on the opposite side thereof from the engine leading into the chamber, timed valve means disposed between the chamber and the crankcase at least one member of which is operatively connected to the crankshaft, a blower mounted in the chamber adjacent to the opening therein and operatively connected to the engine crankshaft for drawing air from outside through the opening and into the chamber, and means for injecting fuel into the incoming air, said valve means opening at least once each engine cycle to allow the air-fuel mixture in the chamber to flow into the crankcase.

2. In an internal combustion engine of the two cycle type comprising a piston, a cylinder for said piston, a crankcase, and a crankshaft operatively connected to said piston in said crankcase, a housing member mounted on the engine having a chamber therein and an opening leading into the chamber, valve means positioned between the chamber and the crankcase including relatively movable members, at least one of which is operatively connected to the crankshaft and both of which have openings that register once each engine cycle, for communicating the chamber and the crankcase, a blower member mounted in said chamber adjacent to the chamber opening and operatively connected to the crankshaft for drawing an excess volume of air from outside through said chamber opening and into the chamber, a fuel jet positioned in the chamber opening for injecting fuel into the incoming air, said valve means opening during part of each engine cycle for delivering a portion of the compressed air-fuel mixture in the chamber to the crankcase.

3. In an internal combustion engine of the two cycle type having a cylinder, a piston, and a crankshaft operatively connected to said piston in a crankcase; a housing having a chamber therein mounted on said engine including rotary valve means disposed between the chamber and the crankcase said rotary valve means including a stationary wall with an opening therethrough and a rotating wall positioned adjacent to the stationary wall having an opening therethrough that registers once each cycle with the opening in the stationary wall, said rotating wall being operatively connected to the crankshaft, said housing having an opening into the chamber in one side thereof and a blower positioned therein adjacent to the opening in spaced relationship from the rotary valve means and operatively connected to the crankshaft for drawing an excess volume of air from outside through the opening and into said chamber, and means for injecting fuel into the incoming air, said valve means periodically opening to allow a portion of the excess air-fuel mixture in the chamber to enter the crankcase.

4. In a two cycle internal combustion engine having a cylinder, a piston movable in the cylinder, and a crankshaft operatively connected to the piston in a crankcase; a housing member mounted on the engine having a chamber formed therein and an opening leading into the chamber, valve means disposed between the chamber and the crankcase, said valve means including a stationary member with passage means therethrough and a rotating member operatively connected to the crankshaft and having passage means therethrough that register once each engine cycle with the passage means through the stationary member, a blower mounted in the chamber adjacent to the opening and operatively geared to the engine crankshaft for drawing air from outside through the opening into the chamber, and means for injecting fuel into the incoming air, said valve means periodically opening to allow a portion only of the air-fuel mixture in the chamber to flow into the crankcase.

5. In the two cycle internal combustion engine defined in claim 4, said blower is geared to the crankshaft to rotate at a speed in excess of the speed of the crankshaft to produce a preselected pressure differential across the valve means.

6. In a two cycle internal combustion engine having a cylinder, a piston movable in the cylinder, and a crankshaft operatively connected to the piston in a crankcase; a housing member mounted on the engine having a chamber formed therein and an opening leading into the chamber, rotary valve means disposed between the chamber and the crankcase, said valve means including relatively movable members having registering openings therethrough, at least one of said members being operatively connected to the crankshaft, a blower mounted in the chamber adjacent to the opening for drawing air from outside through the opening and into the chamber, stationary air deflector means including a radial fin mounted in the chamber between the blower and the rotary valve means to increase the static pressure at the valve opening, and means for injecting fuel into the incoming air, said valve means periodically opening to allow the air-fuel mixture in the chamber to flow into the crankcase.

7. In a two cycle internal combustion engine having a cylinder, a piston movable in the cylinder, and a crankshaft operatively connected to the piston and movable in a crankcase; a carburetor mounted on the engine adjacent to the crankcase, said carburetor comprising a housing having a chamber formed therein and a first opening into the chamber communicating with the engine crankcase, a second opening into the chamber spaced from said first opening communicating with ambient atmosphere, a rotating member operatively connected to the crankshaft and positioned adjacent to said first opening, said rotating member having an opening that periodically registers with said first opening, a blower mounted in said chamber adjacent to said second opening and operatively connected to the engine crankshaft for drawing ambient air from outside through said second opening into the chamber, a stationary air deflector mounted in said chamber, and means for injecting fuel into the incoming air, said blower moving a greater volume of air into the chamber than can move into the crankcase when the opening in the rotating member registers with said first chamber opening.

8. In an internal combustion engine having a cylinder, a piston movable in the cylinder, and a crankshaft operatively connected to the piston and movable in a crankcase, the improvement of a carburetor mounted on the engine, said carburetor comprising a housing having a chamber formed therein, said housing adapted to be mounted on the engine adjacent to the engine crankcase, an opening into said housing on the opposite side thereof from the engine, a blower mounted adjacent said opening and operatively connected to the crankshaft for rotating and drawing an air stream into the chamber, means carried by said housing for injecting fuel into the incoming air stream, a radial fin mounted in the housing on the downstream side from said blower for removing rotary motion from the air stream and imparting static pressure thereto, and valve means connecting the housing chamber with the engine crankcase, said valve means including a stationary member having an orifice therethrough and a rotating member operatively connected to the crankshaft positioned adjacent to said stationary member, said rotating member having an orifice which registers once each engine cycle with the orifice in the stationary member.

References Cited in the file of this patent

UNITED STATES PATENTS

| | | |
|---|---|---|
| 2,432,725 | Connelly | Dec. 16, 1947 |
| 2,463,933 | Adkins | Mar. 8, 1949 |
| 2,547,327 | King | Apr. 3, 1951 |

FOREIGN PATENTS

| | | |
|---|---|---|
| 459,089 | France | June 11, 1913 |
| 104,091 | Great Britain | Feb. 22, 1917 |